Patented Sept. 22, 1931

1,823,983

UNITED STATES PATENT OFFICE

MARTIN LUTHER, OF MANNHEIM, AND HANS WILLE, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

OXIDATION OF HYDROCARBONS AND EXTRACTION OF THE OXIDIZED PRODUCTS

No Drawing. Application filed August 19, 1926, Serial No. 130,352, and in Germany August 25, 1925.

When paraffin hydrocarbons, waxes and similar organic materials of rather high molecular weight are oxidized under strong conditions in order to obtain highly oxidized products, for example acids, dark colored and resinous bodies are formed as by-products of rather small value. This is due to the fact that the primarily formed oxidation products undergo further oxidation, which takes place chiefly near the end of the process when all or nearly all of the initial materials has been converted into oxidation products.

We have now found that the initial material can be completely converted into valuable oxidation products without the formation of valueless by-products by removing the oxidized part from the reaction mixture before the oxidation is finished, and subjecting the non-oxidized part, if desired in mixture with fresh initial material, again to the oxidizing treatment in the manner described. The removal of the oxidation product from the reaction mixture may be effected in any suitable manner. For example the oxidation product may be removed from the reaction mass by heating the latter only to such a high temperature that only the oxidation product which has a lower melting point than the initial material, melts and is removed from the mixture in the liquid state. It is, however, of particular advantage to remove the oxidation products by a treatment with solvents in which the said products are soluble, but in which the non-oxidized or not sufficiently oxidized part of the initial material is insoluble. By this method of working all of the initial material can be converted into a practically homogeneous, highly oxidized, light-colored product.

As solvents suitable for carrying out our present invention we mention for example aliphatic alcohols, pyridine or acetone and their homologues. It is often advantageous to employ solvents containing a small amount of water. The process can be carried out in an especially advantageous manner with methanol or mixed solvents containing methanol.

The highly oxidized products obtained by our said process are very suitable for example as substitutes for olein and for the manufacture of textile soaps. They can be converted with great advantage into products readily soluble in water and having about the character of Turkey red oil by sulfonating them with the aid of concentrated sulfuric acid.

The following examples will further illustrate how our invention may be carried out in practice, but the invention is not limited to these examples.

Example 1

Paraffin wax is oxidized for two hours by a current of air in the manner described in the German Patent No. 405,850. The reaction mixture is treated at room temperature with about 10 times its weight of methanol. The resulting solution is separated from the non-oxidized part by filtration and evaporated. The residue obtained by evaporation of the solution amounts to about 50 per cent of the initial material and has a saponification number of above 200. The residue insoluble in methanol is mixed with paraffin wax, the mixture is oxidized, again treated with methanol in the manner described above and so forth.

Example 2

A reaction mixture obtained in the manner described in Example 1 is treated with 10 times its weight of pyridine containing some water. About 68 per cent of the mixture is dissolved; the residue is mixed with paraffin wax and again subjected to oxidation. The product soluble in pyridine is at room temperature an oily liquid having a saponification number of about 220.

Example 3

An oxidation product obtained according to Example 1 is stirred for 2 hours with one third of its weight of sulfuric acid of 98 per cent strength at 35° C. Thereupon the excess of sulfuric acid is removed by washing with sodium sulfate solution. The resulting product forms stable emulsions with water when mixed with from 3 to 4 times its weight of spindle oil and from 2 to 3 per cent of ammonia.

We do not claim in this application the production of products of the character of Turkey red oil in the manner hereinbefore described, such process forming now the subject matter of another application for patent which has been divided out from this case.

What we claim is:

1. In the process of partly oxidizing paraffin hydrocarbons, waxes and related organic materials in the liquid state and returning unattacked initial material to the oxidation, the step which comprises removing the oxidation products by treatment with a solvent selected from the group consisting of methanol and acetone.

2. In the process of partly oxidizing paraffin hydrocarbons, waxes and related organic materials in the liquid state and returning unattacked initial material to the oxidation, the step which comprises removing the oxidation products by treatment with a solvent comprising acetone.

3. The process of oxidizing paraffin hydrocarbons, waxes and similar organic materials which consists in partly oxidizing the said materials in the liquid state, removing the oxidation products by treatment with a solvent comprising methanol, and subjecting the residue anew to oxidation.

In testimony whereof we have hereunto set our hands.

MARTIN LUTHER.
HANS WILLE.